Patented Sept. 7, 1937

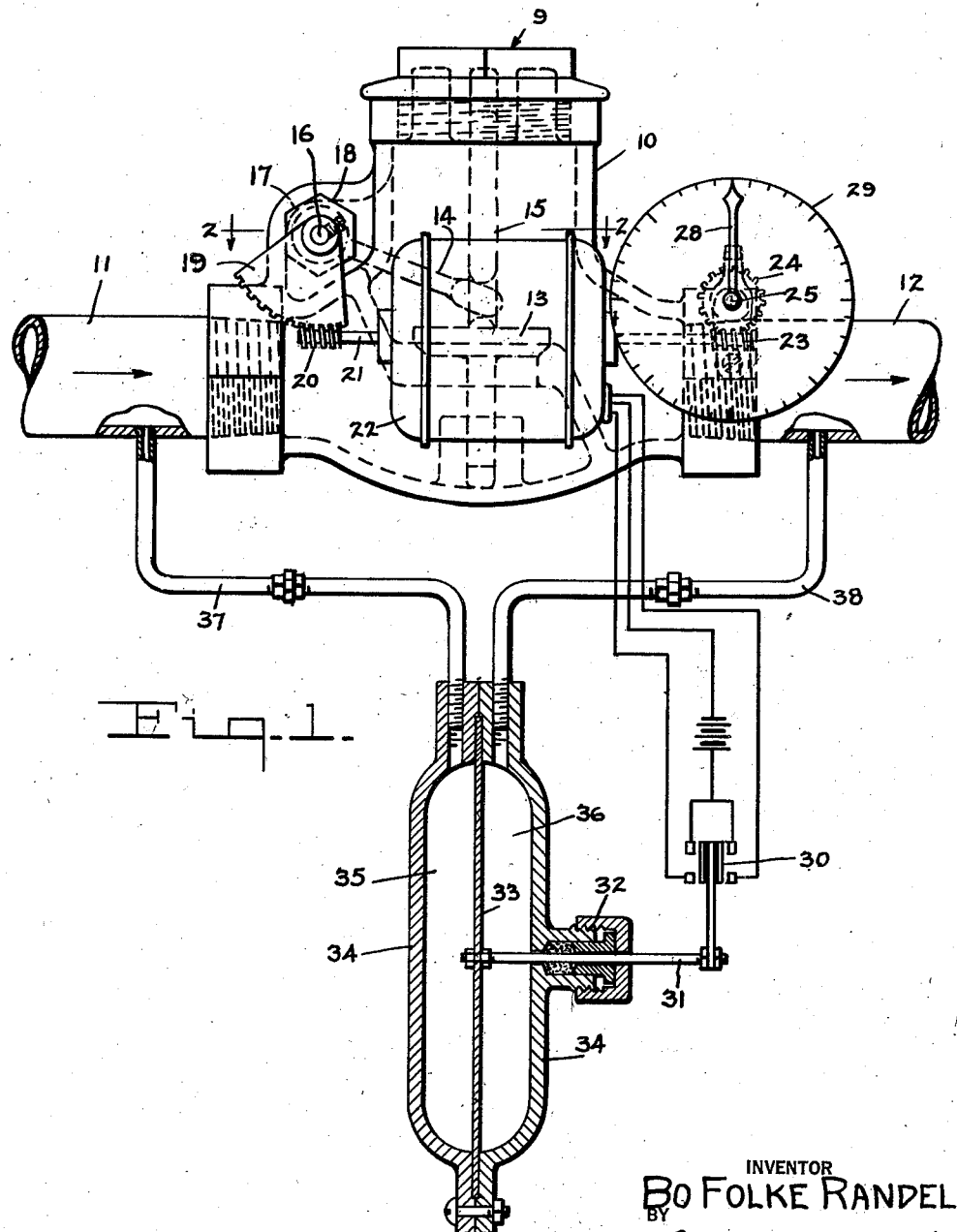

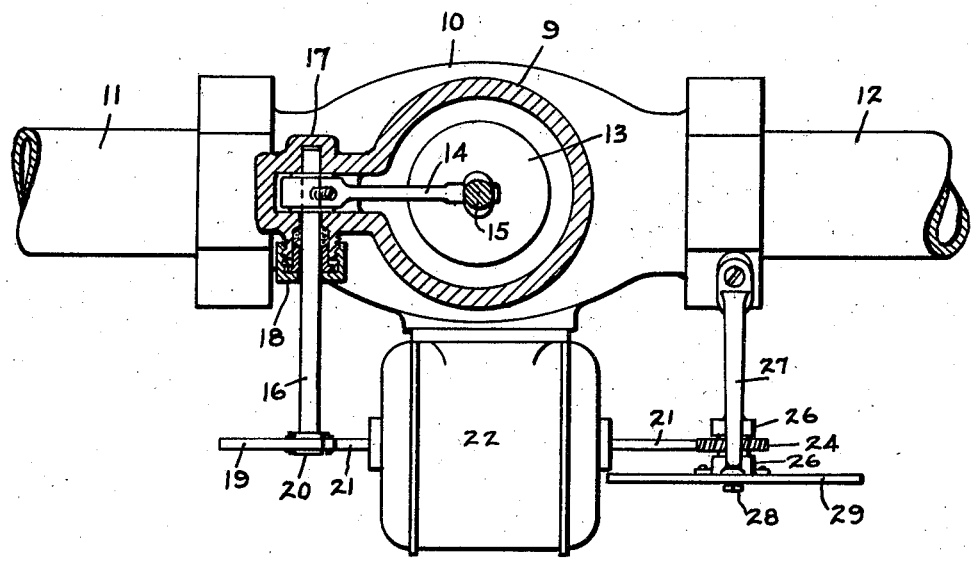

2,092,019

UNITED STATES PATENT OFFICE 2,092,019

FLUID METER

Bo Folke Randel, San Diego, Calif.

Application March 24, 1936, Serial No. 70,717

1 Claim. (Cl. 73—207)

(Granted under the act of March 3, 1883, as amended April 30, 1928; 370 O. G. 757)

This invention relates to the measurement of fluids in motion in pipes or closed channels. The principal object of my invention is the provision of a simple and reliable device for measuring the flow of any fluid, gaseous or liquid, through a pipe or closed channel, in terms of volume or weight, as desired.

The invention is based upon the fact that if the pressure drop of the fluid flowing through a restricted opening inserted in a pipe or closed channel is maintained constant, the size of the opening determines the quantity of fluid passing therethrough. By varying the size of the opening and maintaining the pressure drop constant, different quantities of the fluid will flow through. If means are provided for indicating the size of the opening it is possible to determine and measure the amount of fluid flowing through the opening, provided the pressure drop is maintained constant.

If an automatically operated valve is inserted in the pipe or closed channel and is adjusted so that the pressure drop of fluid flowing through is constant, then the position of the valve or gate will be a function of the quantity of flow.

With these and other objects in view, as well as other advantages that may be incident to the use of the improvements, the invention consists in the parts and combinations thereof hereinafter set forth and claimed, and with the understanding that the several necessary elements constituting the same may be varied in proportion and arrangement without departing from the nature and scope of the invention, as defined in the appended claims.

In order to make the invention more clearly understood, there are shown in the accompanying drawings, means for carrying the invention into practical use, without limiting the improvements in their useful application to the particular construction, which, for the purpose of explanation, have been made the subject of illustration.

In the accompanying drawings:

Fig. 1 is a side elevational view partly in cross-section of a valve mechanism embodying the invention, and Fig. 2 is a horizontal sectional view taken on line 2—2 of Fig. 1.

Referring to the drawings, a flow meter, constructed in accordance with the invention, is shown as comprising a globe valve 9 having a housing 10, connecting pipes 11 and 12, and provided with a valve member 13 for controlling communication therebetween. The valve member 13 is opened and closed by means of a lever arm 14 fixed to a rock shaft 16 for engagement with the stem 15 of the valve 13. The shaft 16 is journalled in a bearing 17 formed in the valve casing 10. One end of the shaft 16 extends through a suitable packing gland 18 and carries a segmental rack 19 for engagement by a worm 20 fixed to the shaft 21 of a direct current motor 22. This motor is of the reversible type and is suitably mounted upon the valve casing 10. The opposite end of the shaft 21 is provided with a worm 23 for engagement with a worm gear 24, fixed to a shaft 25. This shaft is journalled in bearings 26 carried by a bracket 27, which is fixed to the valve casing 10. An indicating hand or pointer 28 is fixed to the outer end of the shaft 25 for movement around a calibrated dial 29, fixed to the bracket 27.

The operation of the motor 22 is controlled by a reversing switch 30 which is connected with the outer end of a rod 31, which is slidably mounted in a packing gland 32, the inner end of the rod 31 being fixed to a flexible diaphragm 33. This diaphragm is clamped between two dish shaped members 34 so as to provide chambers 35 and 36 on opposite sides thereof. These chambers are communicably connected with the pipes 11 and 12 on opposite sides of the valve 9 by pipes 37 and 38, respectively.

As stated, the valve 10 may be of any preferred type and the indicating device may also be of any conventional design, and may be graduated in any desired manner. It will be seen that any change from a predetermined differential pressure on each side of the valve will act upon the diaphragm and rod 31 so as to actuate the reversing switch 30. This switch may also be of a conventional design so as to operate the motor when the pressure drop changes from the predetermined drop at which the diaphragm 33 is adjusted.

Let it be assumed that this predetermined drop is one pound. Any larger demand on the fluid flowing through, as shown by arrows, will cause a drop of discharge pressure and an increase of the pressure differential. This increase will cause the diaphragm 33 to actuate the rod 31 and close the switch 30, thus causing the energizing of the motor 22 and the opening of the valve 9 to supply the larger demand.

The valve member 13 will open until the pressure drop reaches a predetermined value, when the switch 30 will open and deenergize the motor 22. The opening or closing of the valve is accompanied by a corresponding movement of the pointer 28, and the quantity of fluid flowing through the valve is indicated on the calibrated dial 29. Any variation of load will immediately be communicated to the differential pressure mechanism, and thence to the motor, so as to open or close the valve 9. By maintaining a constant pressure drop through the valve, and by observing the position of the pointer 28, the quantity of fluid flowing through the valve may readily be ascertained.

The invention herein described may be modified in construction and arrangement of the parts by those skilled in the art without departing from the nature and scope of the invention as defined in the appended claim.

The invention described herein may be manufactured and used by or for the Government of the United States of America for governmental purposes without the payment of any royalties thereon or therefor.

I claim:

In a fluid flow meter the combination of a conduit having a valve for controlling the flow of fluid therethrough; a reversible electric motor operable to open and close said valve; a casing having a flexible diaphragm therein and dividing the interior thereof into two chambers; means for establishing fluid communication between one of said chambers and said conduit on the inlet side of said valve; means for establishing fluid communication between the other of said chambers and said conduit on the outlet side of said valve, whereby said diaphragm will be flexed by differential pressures developing in said conduit on opposite sides of said valve; a reversing switch operable when said diaphragm is flexed for controlling said motor; and means also operable by said motor for indicating the position of said valve and the resulting volume of the fluid flowing therethrough.

BO FOLKE RANDEL.